US011750708B2

(12) United States Patent
Yao et al.

(10) Patent No.: US 11,750,708 B2
(45) Date of Patent: Sep. 5, 2023

(54) METHOD AND DEVICE FOR PROXY BETWEEN DIFFERENT ARCHITECTURES

(71) Applicant: Telefonaktiebolaget LM Ericsson (publ), Stockholm (SE)

(72) Inventors: Yidong Yao, Shanghai (CN); Juying Gan, Shanghai (CN); Xiao Li, Shanghai (CN); Gang Ren, Shanghai (CN); Yiming Wu, Shanghai (CN); Deqin Zhan, Shanghai (CN); Hanbing Zhang, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 249 days.

(21) Appl. No.: 16/755,605

(22) PCT Filed: Oct. 13, 2017

(86) PCT No.: PCT/CN2017/106112
§ 371 (c)(1),
(2) Date: Apr. 13, 2020

(87) PCT Pub. No.: WO2019/071584
PCT Pub. Date: Apr. 18, 2019

(65) Prior Publication Data
US 2021/0377357 A1 Dec. 2, 2021

(51) Int. Cl.
*H04L 67/288* (2022.01)
*H04L 9/40* (2022.01)
*H04L 67/1087* (2022.01)
*H04L 67/51* (2022.01)

(52) U.S. Cl.
CPC ........ *H04L 67/288* (2013.01); *H04L 63/0815* (2013.01); *H04L 67/1087* (2013.01); *H04L 67/51* (2022.05)

(58) Field of Classification Search
CPC . H04L 67/288; H04L 67/1087; H04L 67/562; H04L 67/51
See application file for complete search history.

(56) References Cited

U.S. PATENT DOCUMENTS

| 2002/0143641 | A1* | 10/2002 | Thomas | G06Q 30/02 |
| | | | | 705/26.44 |
| 2007/0118744 | A1* | 5/2007 | Huang | H04W 12/06 |
| | | | | 713/168 |
| 2008/0140809 | A1* | 6/2008 | Kim | H04L 67/51 |
| | | | | 709/219 |
| 2008/0307081 | A1 | 12/2008 | Dobbins et al. | |

(Continued)

FOREIGN PATENT DOCUMENTS

| CN | 101621435 A | 1/2010 |
| CN | 101964797 A | 2/2011 |

(Continued)

OTHER PUBLICATIONS

Office Action dated Jul. 16, 2021, Japanese Patent Application No. 2020-519752, 5 pages.

(Continued)

*Primary Examiner* — Douglas B Blair
(74) *Attorney, Agent, or Firm* — SAGE PATENT GROUP

(57) ABSTRACT

The present disclosure proposes a proxy method, comprising receiving a request for a service in a first architecture from a requester network function (NF) in a second architecture, obtaining a response of the service from a serving NF on behalf of the requester NF, and sending a further response to the requester NF based on the response of the service. The proxy method may be implemented on a NF or a function entity within a NF.

6 Claims, 4 Drawing Sheets

(56) References Cited

U.S. PATENT DOCUMENTS

| | | | |
|---|---|---|---|
| 2009/0307298 A1 | 12/2009 | Jaiswal et al. | |
| 2015/0229712 A1 | 8/2015 | Zhang | |
| 2018/0192471 A1* | 7/2018 | Li | H04W 4/60 |
| 2018/0199398 A1* | 7/2018 | Dao | H04L 67/148 |
| 2018/0205637 A1* | 7/2018 | Li | H04L 65/40 |
| 2018/0227871 A1* | 8/2018 | Singh | H04W 48/18 |
| 2020/0015158 A1* | 1/2020 | So | H04W 8/20 |

FOREIGN PATENT DOCUMENTS

| | | |
|---|---|---|
| CN | 105144111 A | 12/2015 |
| CN | 105681437 A | 6/2016 |
| CN | 105721562 A | 6/2016 |
| CN | 106254471 A | 12/2016 |
| CN | 106878393 A | 6/2017 |
| JP | 2015-045897 A | 3/2015 |
| JP | 2015-165657 A | 9/2015 |
| WO | WO 2016/061243 A1 | 4/2016 |
| WO | WO 2017164932 A1 | 9/2017 |

OTHER PUBLICATIONS

International Search Report and Written Opinion of the International Searching Authority, PCT/CN2017/106112, dated Feb. 28, 2018, 6 pages.
First Office Action, Chinese Patent Application No. 201780095785.7, dated Oct. 8, 2021, 8 pages.
Supplementary European Search Report, EP17928418.7, dated Jun. 9, 2020, 4 pages.

* cited by examiner

METHOD AND DEVICE FOR PROXY BETWEEN DIFFERENT ARCHITECTURES

CROSS REFERENCE TO RELATED APPLICATIONS

This application is a 35 U.S.C. § 371 national stage application of PCT International Application No. PCT/CN2017/106112 filed on Oct. 13, 2017, the disclosure and content of which is incorporated by reference herein in its entirety.

TECHNICAL FIELD

The present disclosure relates to a communication network, particularly to method and device for proxy between different architectures in a communication network.

BACKGROUND

A communication network may have many network functions (NFs), e.g. to provide various services or undertake various functions. A network function can be implemented either as a network element on a dedicated hardware, as a software instance running on a dedicated hardware, or as a virtualized function instantiated on an appropriate platform, e.g. on a cloud infrastructure.

The interaction between network functions in an architecture is represented in the way of the architecture. A communication network may have multiple different architectures, e.g., the service-based architecture (SBA) and the point-to-point (P2P) architecture.

In the service-based architecture, network functions (e.g. Access and Mobility Management Function, AMF) within the control plane enables other authorized network functions to access their services. This architecture also includes point-to-point reference points where necessary. FIG. 1 shows an exemplary service-based architecture.

In FIG. 1, the NRF stands for the Network Repository Function, which is a network function supporting registration, de-registration, authorization and discovery of network function service, as described below.

Network Function Service Registration and De-Registration

For the NRF to properly maintain the information of available NFs and their supported services, each NF informs the NRF of the list of NF services that it supports.

The NF may make this information available to NRF when the NF becomes operative for the first time (registration operation) or upon individual NF service instance activation/de-activation within the NF (update operation) e.g. triggered after a scaling operation. The NF while registering the list of NF services it supports, for each NF service, may provide a notification endpoint information for each type of notification service that the NF service is prepared to consume, to the NRF during the NF registration. The NF may also update or delete the NF service related parameters (e.g. to delete the notification endpoint information). Alternatively, another authorized entity (such as an Operation Administration & Management, OA&M function) may inform the NRF on behalf of an NF triggered by an NF service lifecycle event (register or de-registration operation depending on instantiation, termination, activation, or de-activation). Registration with the NRF includes capacity and configuration information at time of instantiation.

The NF may also de-registers from the NRF when it's about to gracefully shut down or disconnect from the network in a controlled way. If an NF becomes unavailable or unreachable due to unplanned errors (e.g. NF crashes or there are network issues), an authorized entity shall deregister the NF with the NRF.

Network Function Service Authorization

NF service authorization ensures the NF Service Consumer is authorized to access the NF service provided by the NF Service Provider, according to e.g. the policy of NF, the policy from the serving operator, the inter-operator agreement.

Service authorization information is one of the components in NF profile of the NF Service Producer. It shall include the NF type(s) allowed to consume NF Service(s) of NF Service Producer.

Due to roaming agreements and operator policies, a NF Service Consumer shall be authorized based on UE/subscriber/roaming information and NF type, the Service authorization may entail two steps:

- Check whether the NF Service Consumer is permitted to discover the requested NF Service Producer during the NF service discovery procedure. This is performed on a per NF granularity by NRF.
- Check whether the NF Service Consumer is permitted to access the requested NF Service Producer for consuming the NF service. This is performed on a per UE, subscription or roaming agreements granularity. This type of NF Service authorization is embedded in the related NF service logic.

Network Function Service Discovery

Unless the expected NF and NF service information is locally configured on the requester NF, the NF service discovery is implemented via the NRF.

In order to enable access to a requested NF service, the requester NF initiates the NF service discovery by providing the service parameters of the requested service to discover the target NE.

Depending on the chosen message routing model, the NRF may provide the IP address or the Fully Qualified Domain Name (FQDN) or the identifier of relevant services and/or NF(s) to the requester NF for target NF selection. Based on that information, the requester NF can select a NF that is able to provide a particular NF Service.

For NF discovery across Public Land Mobile Networks (PLMNs), the requester NF provides the NRF the PLMN ID of the target NE The NRF in the local PLMN reaches the NRF in the target PLMN by forming a target PLMN specific query using the PLMN ID provided by the requester NE.

The NRF in the local PLMN interacts with the NRF in the target PLMN to retrieve the IP address or the FQDN or the identifier of relevant services of the target NF(s).

FIG. 2 illustrates an exemplary P2P architecture, which focuses on the interactions between pairs of network functions described by point-to-point reference point between any two network functions. In the P2P architecture, the interaction among network functions is tightly defined and each of interface, message and so on has strict sequence, usage, and definition.

SUMMARY

Inventors of the present disclosure find that network functions within an architecture cannot communicate with network functions within another architecture readily and vice versa, making communication between network functions in different architectures difficult. For example, for the SBA and P2P architecture, inventors of the present disclosure find the following drawbacks: ① the P2P reference point included in the SBA increase the complexity of network; ② network functions within the SBA cannot communicate with network functions within the P2P architecture readily and vice versa; ③ the interworking between 5G Core and Evolved Packet Core (EPC) cannot be service-based.

To resolve or alleviate at least some of the above drawbacks, the inventors propose adding a new proxy between different architectures to enable the communication between NFs in the different architectures without any impact of configuration/behavior changes to the NFs.

According to an aspect of the present disclosure, there is provided a proxy method, comprising: receiving a request for a service in a first architecture from a requester NF in a second architecture, obtaining a response of the service from a serving NF on behalf of the requester NF, and sending a further response to the requester NF based on the response of the service. The proxy method may be implemented on a NF or a function entity within a NF.

According to another aspect of the present disclosure, there is provided a proxy device, comprising: receiving unit, for receiving a request for a service in a first architecture from a requester NF in a second architecture; obtaining unit, for obtaining a response of the service from a serving NF on behalf of the requester NF; and sending unit, for sending a further response to the requester NF based on the response of the service. The proxy device may be a NF or a function entity within a NF.

According to yet another aspect of the present disclosure, there is provided a proxy device, comprising a processor; and a memory, having stored instructions that when executed by the processor cause the proxy device to perform the above method.

The provided solutions in the above have the following advantages:
keeping the NFs in an architecture purely with standard definitions and function requirement of the architecture;
keeping the NFs in an architecture connected with the NFs in another architecture without any impact to the NFs;
simplifying the network deployment.

BRIEF DESCRIPTION OF THE DRAWINGS

The embodiments herein will now be described in more detail in the following detailed description by reference to the appended drawings illustrating the embodiments and in which.

The elements of the drawings are not necessarily to scale relative to each other. Like numbers refer to like elements throughout the drawings.

DETAILED DESCRIPTION OF EMBODIMENTS

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

As described above, to resolve or alleviate at least some of the drawbacks in the prior art, the inventors propose adding a new proxy between different architectures to enable the communication between NFs in different architectures without any impact of configuration/behavior changes to the NFs.

Figure 1:
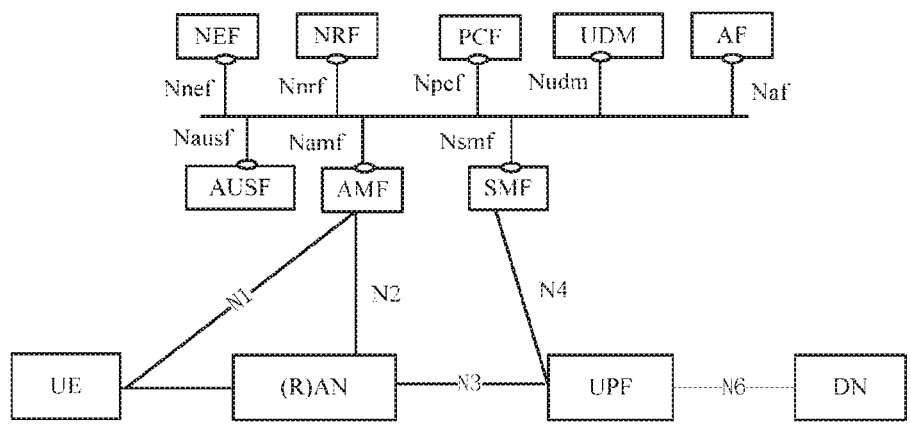
FIG. 1 schematically illustrates an exemplary service-based architecture.
Figure 2:
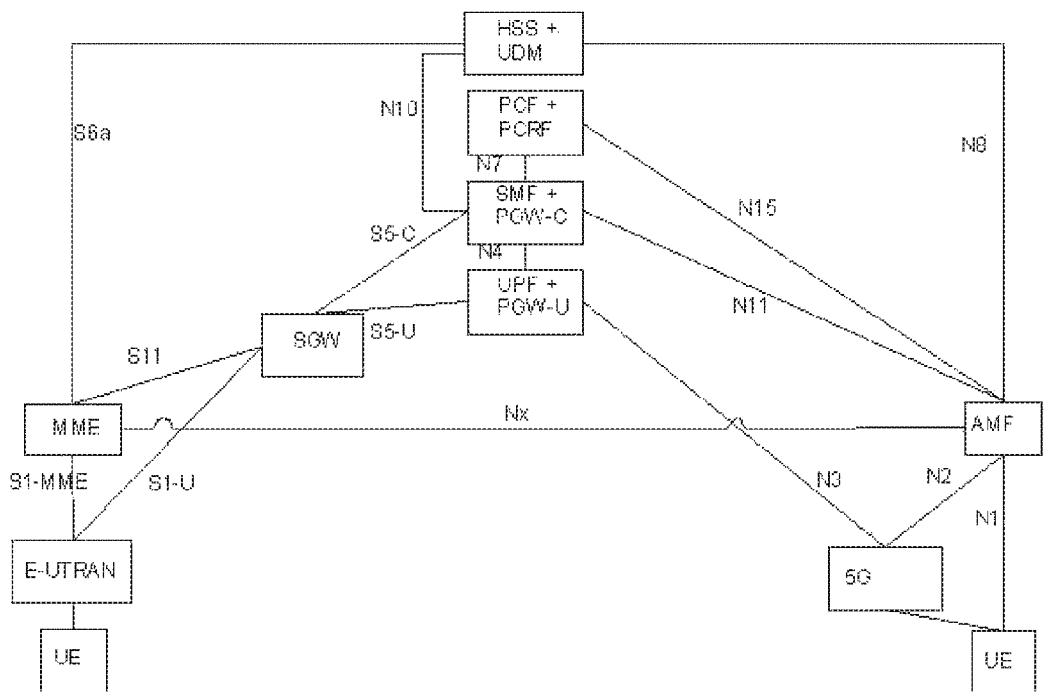
FIG. 2 schematically illustrates an exemplary P2P architecture.
Figure 3:
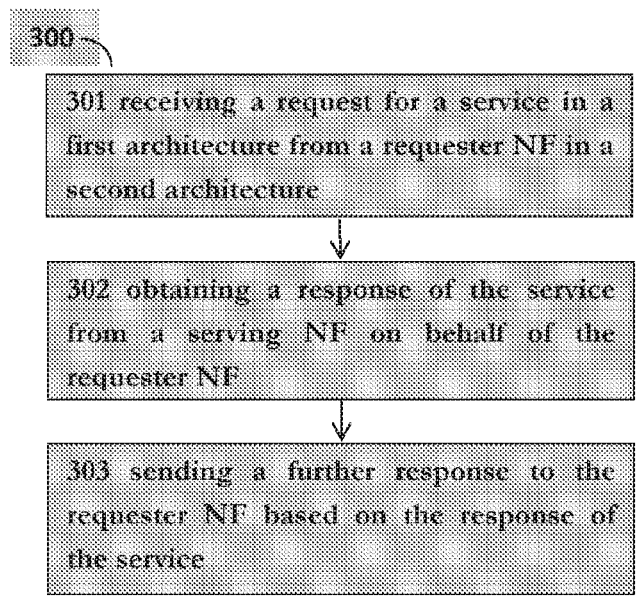
FIG. 3 schematically illustrates a flowchart of the proxy method of the present disclosure.

A flowchart of the proxy method of the present disclosure is shown in FIG. 3. The method is illustrated as method 300 in FIG. 3, and comprises the following steps: step 301 of receiving a request for a service in a first architecture from a requester NF in a second architecture, step 302 of obtaining a response of the service from a serving NF on behalf of the requester NF, and step 303 of sending a further response to the requester NF based on the response of the service. The proxy method may be implemented on a NF or a function entity within a NF.

Now, further embodiments will be described in connection with the SBA and P2P architecture. It will be understood that, although specific terms are used here, the embodiments are not limited to those specific terms but may be applied to all similar entities. For example, the "device" herein may refer to e.g. apparatus, station, node and so on. It can also understood that, although the further embodiments herein are described in the context of the SBA and P2P architecture, the embodiments can be also applied to other different architectures, if interaction between network functions in the different architectures is desired.

I. The First Architecture is a P2P Architecture, and the Second Architecture is a SBA.

In this situation, the requester NF which requests the service is located in the SBA, and the serving NF which provides the service is located in the P2P architecture.

Figure 4:
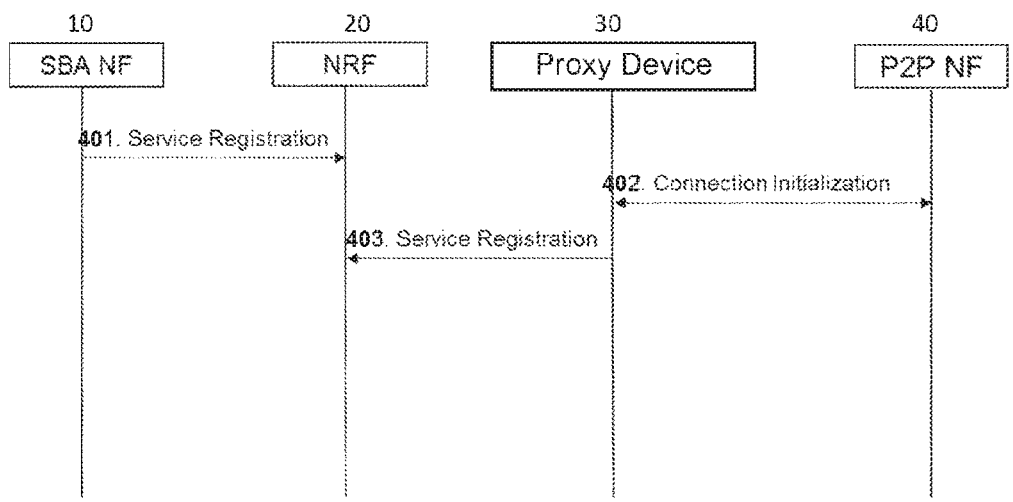
FIG. 4 schematically illustrates an exemplary service registration by the proxy device.

FIG. 4 schematically illustrates an exemplary service registration by the proxy device for this situation. A NF 10 within the SBA may register 401 its service to the NRF 20. A service provided by a NF 40 within the P2P architecture may also be registered 403 in the NRF 20, for example by a proxy device 30, on behalf of the NF 40, if the service has not been registered on the NRF 20. Before the service registration on behalf of the NF 40, if an initialization is needed, a P2P connection with the NF 40 may be established 402, e.g., between the proxy device 30 and the NF 40.

Figure 5:
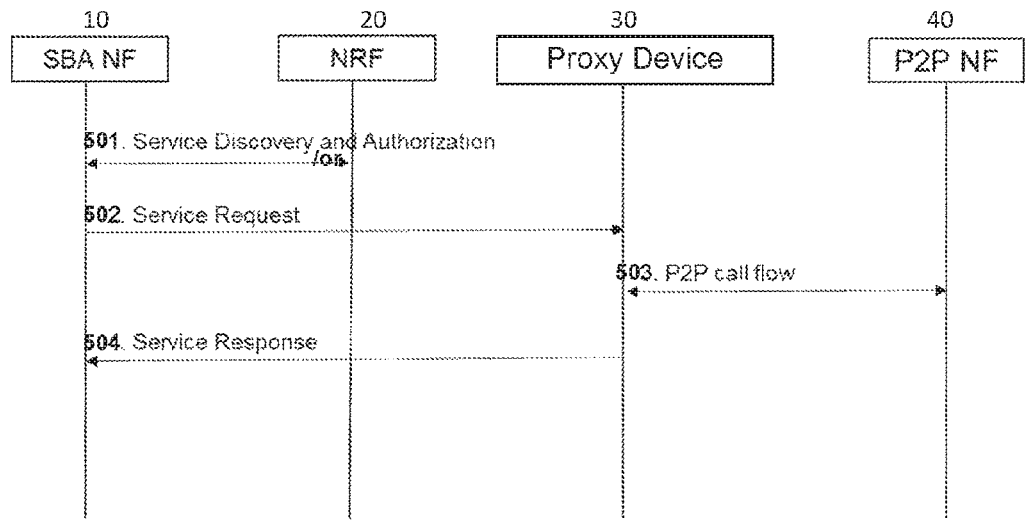
FIG. 5 schematically illustrates an exemplary embodiment of the present disclosure.

FIG. 5 schematically illustrates an exemplary embodiment of the present disclosure for this situation. A NF 10 within the SBA, with help of the NRF 20, discovers 501 a specific target NF which relates to a service expected by the NF 10, if the NF 10 does not know which NF the target NF is yet. In this exemplary embodiment, the service is e.g. a service which was registered on the NRF 20 and is provided by a NF 40 in the P2P architecture, and the target NF is e.g. a NF where the proxy device 30 resides or the proxy device 30, which registered the service on the NRF 20 on behalf of the NF 40. Additionally, the NF service authorization of the NRF 20 ensures the service requester NF 10 is authorized 501 to access the expected NF service, if the authorization for the service is needed. Then, the NF 10 sends 502 a service request for the service to the discovered NF, e.g., the proxy device 30 in this exemplary embodiment. The proxy device 30 receives the service request and realizes the requested service is provided by the serving NF 40 in the P2P architecture, then the proxy device 30 obtains a response of the service from the serving NF 40 on behalf of the requester NF 10, for example by initiating 503 a P2P call flow with the serving NF 40 to get the response from the NF 40. Upon receipt of the response, the proxy device 30 sends 504 a further response to the requester NF 10 based on the response from the NF 40.

II. The First Architecture is a SBA, and the Second Architecture is a P2P Architecture.

In this situation, the requester NF which requests the service is located in the P2P architecture, and the serving NF which provides the service is located in the SBA.

Figure 6:
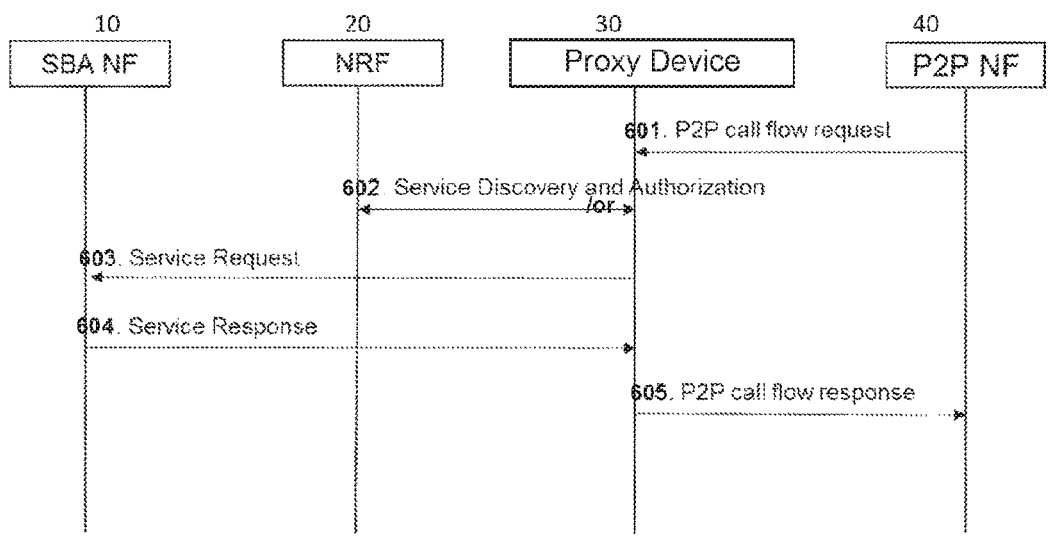
FIG. 6 schematically illustrates another exemplary embodiment of the present disclosure.

FIG. 6 schematically illustrates an exemplary embodiment of the present disclosure for this situation. A NF 40 in the P2P architecture initiates 601 a call flow request for a specific service, e.g. to the proxy device 30. The proxy device 30 receives the P2P call flow request and realizes the requested service is provided by a serving NF in the SBA. If the proxy device 30 has already known which NF the serving NF is (for example, information about the service and the serving NF is already locally configured on the proxy device 30), the proxy device 30 may obtain a response of the service from the serving NF, e.g., a NF 10 in the exemplary embodiment, on behalf of the requester NF 40, by sending 603 a further request for the service to the serving NF 10. If the proxy device 30 does not know which NF the serving NF is, the proxy device 30 may discover 602 the serving NF which provides the requested service, with the help of the NRF 20, before sending 603 a further request for the service to the serving NF, e.g., the NF 10 in the exemplary embodiment. The proxy device 30 may also get an authorization 602 for the service with the help of the NRF 20, if the authorization for the service is needed. The NF 10 handles the further request for the service and responds to the proxy device 10 with a response of the service 604. Upon receipt of the response, the proxy device 30 sends 605 a further response, e.g., a p2p call flow response, to the requester NF 40 based on the response from the NF 10.

Figure 7:
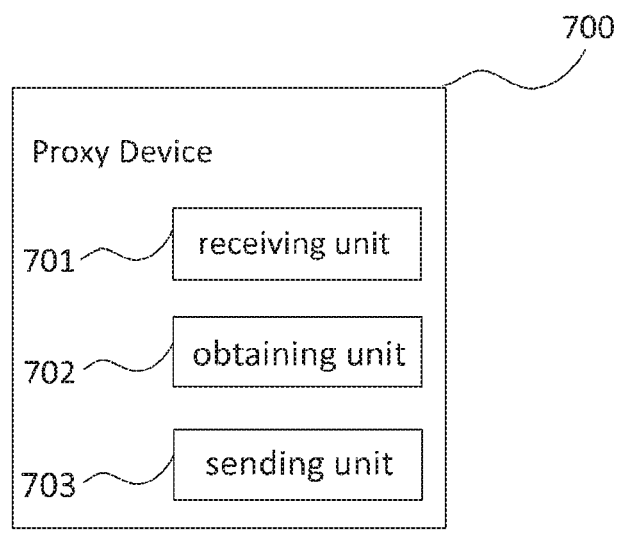
FIG. 7 is a schematic block diagram of the proxy device of the present disclosure.

FIG. 7 is a schematic block diagram of the proxy device of the present disclosure, which is illustrated as proxy device 700 in the figure. The proxy device 700 includes a receiving unit 701 for receiving a request for a service in a first architecture from a requester NF in a second architecture, a obtaining unit 702 for obtaining a response of the service from a serving NF on behalf of the requester NF, and a sending unit 703 for sending a further response to the requester NF based on the response of the service.

It can be appreciated that, the proxy device 700 described herein may be implemented by various units, so that the proxy device 700 implementing one or more functions of the proxy device described with the embodiments may comprise not only the units 701, 703 and 703, but also other units for implementing one or more functions of the proxy device described with the embodiments, for example, the proxy device 700 may further includes a registering unit for registering the service in the service-based architecture on behalf of the serving NF. In addition, the proxy device 700 may comprise separate units for each separate function, or a single unit may be configured to perform two or more functions. Moreover, the units may be implemented in hardware, firmware, software, or combinations thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 8:
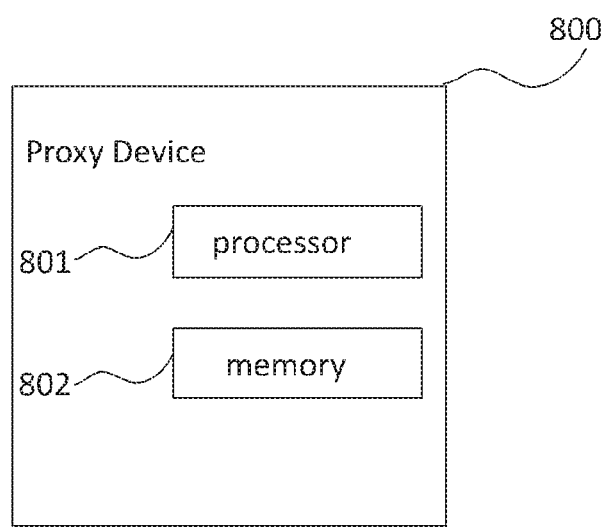
FIG. 8 is another schematic block diagram of the proxy device of the present disclosure.

Therefore, the present disclosure also provides a proxy device 800 including a processor 801 and a memory 802, as shown in FIG. 8. In the proxy device 800, the memory 802 stores instructions that when executed by the processor 801 cause the proxy device 800 to perform the proxy method described above with the embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A proxy method, comprising:
   registering a service in a second architecture on behalf of a network function (NF) in a first architecture, wherein the first architecture is a point-to-point architecture, and wherein the second architecture is a service-based architecture;
   receiving a request for the service in the first architecture from a requester NF in the second architecture;
   sending a further request for the service to a serving NF in the first architecture, wherein if which NF that is the serving NF has not been known yet, the serving NF which provides the requested service is discovered with help of a Network Repository Function (NRF);
   obtaining a response of the service from the serving NF on behalf of the requester NF; and
   sending a further response to the requester NF based on the response of the service.

2. The proxy method of claim 1, wherein the proxy method is implemented on a NF or a function entity within a NF.

3. The proxy method of claim 1, wherein the obtaining comprises initiating a P2P call flow with the serving NF.

4. A proxy device, comprising:
   a processor; and
   a memory, having stored instructions that when executed by the processor cause the proxy device to perform operations comprising:
   registering a service in a second architecture on behalf of a network function (NF) in a first architecture, wherein the first architecture is a point-to-point architecture, and wherein the second architecture is a service-based architecture;
   receiving a request for the service in the first architecture from a requester NF in the second architecture;
   sending a further request for the service to a serving NF in the first architecture, wherein if which NF that is the serving NF has not been known yet, the serving NF which provides the requested service is discovered with help of a Network Repository Function (NRF);
   obtaining a response of the service from the serving NF on behalf of the requester NF; and
   sending a further response to the requester NF based on the response of the service.

5. The proxy device of claim 4, wherein the proxy device is a NF or a function entity within a NF.

6. The proxy device of claim 4, wherein the obtaining comprises initiating a P2P call flow with the serving NF.

* * * * *